United States Patent
Lee

(10) Patent No.: US 9,020,758 B2
(45) Date of Patent: Apr. 28, 2015

(54) METHOD AND DEVICE FOR GENERATING INTERSECTION GUIDANCE INFORMATION

(71) Applicant: HYUNDAI MNSOFT, Inc., Seoul (KR)

(72) Inventor: Seok Ho Lee, Seoul (KR)

(73) Assignee: HYUNDAI MNSOFT, Inc., Seoul (KR)

( * ) Notice: Subject to any disclaimer, the term of this patent is extended or adjusted under 35 U.S.C. 154(b) by 0 days.

(21) Appl. No.: 14/066,843

(22) Filed: Oct. 30, 2013

(65) Prior Publication Data

US 2014/0149035 A1    May 29, 2014

(30) Foreign Application Priority Data

Nov. 23, 2012 (KR) .................. 10-2012-0133609

(51) Int. Cl.
*G01C 21/00* (2006.01)
*G01C 21/36* (2006.01)

(52) U.S. Cl.
CPC ........ *G01C 21/3626* (2013.01); *G01C 21/3644* (2013.01)

(58) Field of Classification Search
USPC .................. 701/410, 426, 428, 437, 438, 527
See application file for complete search history.

(56) References Cited

U.S. PATENT DOCUMENTS

| | | | |
|---|---|---|---|
| 2002/0120397 A1 * | 8/2002 | Kepler | .......... 701/209 |
| 2009/0306882 A1 | 12/2009 | Vijayakrishnan et al. | |
| 2010/0174481 A1 | 7/2010 | Kang | |

FOREIGN PATENT DOCUMENTS

| | | |
|---|---|---|
| KR | 10-2008-0104548 | 12/2008 |
| WO | 2008/147006 A1 | 12/2008 |
| WO | 2010/081549 A1 | 7/2010 |

OTHER PUBLICATIONS

European Search Report in corresponding European Application 13190449.2, dated Mar. 21, 2014.

* cited by examiner

*Primary Examiner* — Kim T Nguyen
(74) *Attorney, Agent, or Firm* — Bacon & Thomas, PLLC

(57) ABSTRACT

A device for generating intersection guidance information, which includes: a route setting unit configured to receive a route up to a destination; a candidate area detecting unit configured to search for a turning point on the searched route, and detect a surrounding area of the searched turning point as a candidate area; a candidate POI area detecting unit configured to detect a POI area as a candidate POI area, at least a portion of the POI area being included in the candidate area; a guidance POI area selecting unit configured to calculate distance between the candidate POI area and the turning point, search a candidate POI area whose distance calculated is shortest, and select the searched candidate POI area as a guidance POI area.

6 Claims, 7 Drawing Sheets

METHOD AND DEVICE FOR GENERATING INTERSECTION GUIDANCE INFORMATION

RELATED APPLICATIONS

This application claims the benefit of Korean Patent Application No. 10-2012-0133609, filed on Nov. 23, 2012, which is hereby incorporated by reference as if fully set forth herein.

FIELD OF THE INVENTION

The present invention relates to a navigation system, and, more specifically, to a device and method for actively generating intersection guidance information for turning using geometry information of a map.

BACKGROUND OF THE INVENTION

The related art includes the Korean Laid-Open Patent Publication No. 10-2008-0104548, entitled "Method for guiding intersection using point of interest and navigation system thereof." The above related art makes use of POI (Point of Interest) information to improve turning guidance information using surrounding POI information of an intersection.

FIG. 1 illustrates a block diagram of a navigation system for intersection guidance in the related art. Referring to FIG. 1, the navigation system includes a route calculation unit 20, a storage 30, a user interface unit 40, a display unit 50, a voice output unit 60, and a controller 70.

The storage 30 includes map data for the whole country and a map database that constructs route guidance data associated with the map data. In this case, intersection guidance information may be generated using values that have been investigated and fixed previously. That is, when there is an intersection on the map data, the navigation system displays an arrow, for example, in an intersection area indicating a turning direction. However, the intersection guidance navigation system has a problem in that the system can not actively generate the intersection guidance information and merely provided the guidance information stored previously as it.

SUMMARY OF THE INVENTION

In view of the above, the present invention provides a device and method for actively generating intersection guidance information that is needed for a client to turn in real time by analyzing geometry data (e.g., area information of building, more specifically, polygon data, etc) on a map while providing route navigation services.

Further, the present invention provides a device and method for generating intersection guidance information, capable of storing and managing data smaller than those in the related art, by actively generating the intersection guidance information while providing a route navigation service, instead of using guidance information for intersections stored previously.

Further, the present invention provides a device and method for generating intersection guidance information based on changed environment information around the intersections so that the intersection guidance information is adaptively generated while providing the route navigation services.

In accordance with an aspect of the present invention, there is provided a device for generating intersection guidance information, which includes: a route setting unit configured to receive a route up to a destination; a candidate area detecting unit configured to search for a turning point on the searched route, and detect a surrounding area of the searched turning point as a candidate area; a candidate POI (point of interest) area detecting unit configured to detect a POI area as a candidate POI area, at least a portion of the POI area being included in the candidate area; a guidance POI area selecting unit configured to calculate distance between the candidate POI area and the turning point, search a candidate POI area whose distance calculated is shortest, and select the searched candidate POI area as a guidance POI area; and guidance information generating unit configured to generate guidance information for an intersection including the guidance POI area.

In the exemplary embodiment, wherein the guidance information further comprises at least one of a distance from a current position to the intersection, and turning direction information at the intersection.

In the exemplary embodiment, wherein the candidate area detecting unit sets the searched turning point, and a first point and a second point that are set apart from the searched turning point at a predetermined distance, and detects as a candidate area an internal area of an arbitrary closed curve that passes through all of the turning point, and the first and second points.

In the exemplary embodiment, wherein the turning direction information comprises at least one of a left turn, a right turn, a U-turn, a P-turn and a rotary turn.

In the exemplary embodiment, wherein the guidance POI area selecting unit calculates distance between the candidate POI area and the turning point, and selects as a guidance POI area a candidate POI area whose distance calculated is shortest.

In the exemplary embodiment, wherein the guidance POI area selecting unit selects the guidance POI area in consideration of at least one of a client's position, a client's moving direction and a final destination.

In the exemplary embodiment, wherein the route setting unit receives a route that is searched from an external device or a route that is searched internally and sets the searched route as input data to generate guidance information.

In the exemplary embodiment, wherein when the candidate POI area detecting unit did not detect the candidate POI area, the candidate area detecting unit sets a third point and a fourth point that are apart from the turning point at a distance determined previously, the third and fourth points being different from the first point or the second point, and detects as a candidate area an internal area of an arbitrary closed curve that passes through all of the turning point, the third point, and the fourth point.

In accordance with an embodiment of the present invention, there is provided a method for generating intersection guidance information performed by a server, which includes: searching a route up to a destination; searching for a turning point on the route to detect as a candidate area a surrounding area of the searched turning point; detecting a POI (Point Of Interest) area as a candidate POI area, at least a portion of the POI area being included in the candidate area; calculating distance between the candidate POI area and the turning point, searching for a candidate POI area whose distance calculated is shortest, and selecting the searched candidate POI area as a guidance POI area; and generating guidance information for a intersection including the guidance POI area.

In the exemplary embodiment, wherein the guidance information further comprises at least one of a distance from a current position to the intersection, and turning direction information at the intersection.

In the exemplary embodiment, wherein said detecting a surrounding area of the searched turning point as a candidate area comprises: setting the searched turning point and a first point and a second point that are set apart from the searched turning point at a predetermined distance; and detecting as a candidate area an internal area of an arbitrary closed curve that passes through all of the turning point, and the first and second points.

In the exemplary embodiment, wherein the turning direction information comprises at least one of a left turn, a right turn, a U-turn, a P-turn and a rotary turn.

In the exemplary embodiment, wherein said selecting the searched candidate POI area as a guidance POI area comprises: calculating distance between the candidate POI area and the turning point, and selecting as a guidance POI area a candidate POI area whose distance calculated is shortest.

In the exemplary embodiment, the method further comprising: when not detecting a candidate POI area in said detecting the candidate POI area, determining whether to detect a candidate POI area in order to detect the candidate area, wherein said detecting the candidate POI area comprises detecting another candidate area different from the candidate area detected previously.

In the exemplary embodiment, wherein said selecting the searched candidate POI area as a guidance POI area comprises: selecting a guidance POI area in consideration of at least one of a client's position, a client's moving direction and a final destination.

As set for the above, the present invention may provide a device and method for generating intersection guidance information that is needed for a client to turn in real time by analyzing geometry data on a map while providing route navigation services.

Further, the present invention may provide a device and method for generating intersection guidance information, capable of storing and managing data smaller than those in the art, by generating the intersection guidance information while providing a route navigation service, without using guidance information for intersections stored previously.

In addition, the present invention may provide a device and method for generating intersection guidance information based on changed environment information around the intersections since the guidance information of intersections is generated while providing the route navigation services.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Meanwhile, it should be noted that the terminologies used herein is merely intended to describe the embodiments and do not limit the scope of the present invention.

A device and method for generating intersection guidance information in accordance with an exemplary embodiment of the present invention relates to a device and method for generating guidance information utilizing POI information around intersections when generating information to guide turning points on intersections among links of searched route. Since current maps around intersections are used without using guidance information stored previously when providing route guidance services, it is possible to provide guidance information changed as buildings around intersections and situations are changed.

Figure 1:
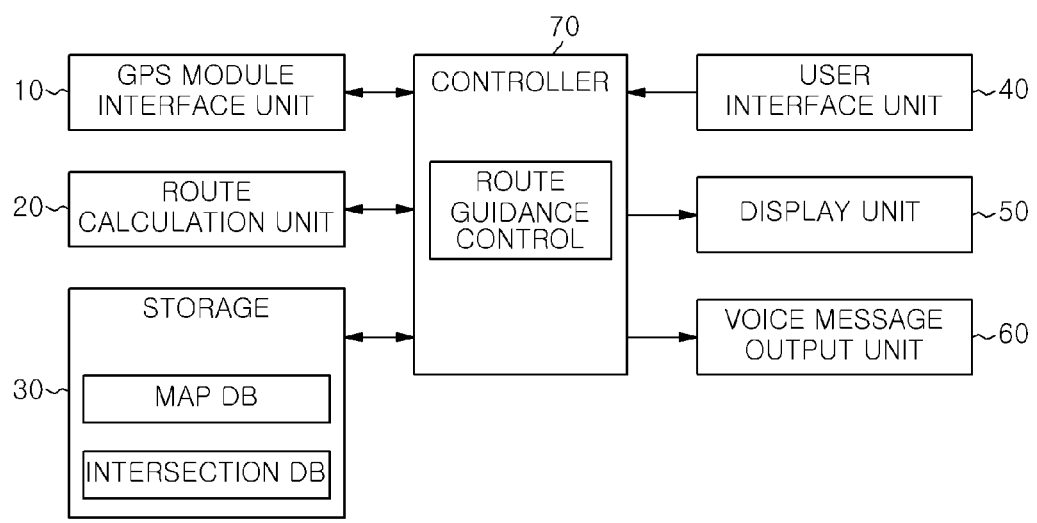
FIG. 1 illustrates a block diagram of a navigation system for an intersection guidance in the related art.
Figure 2:
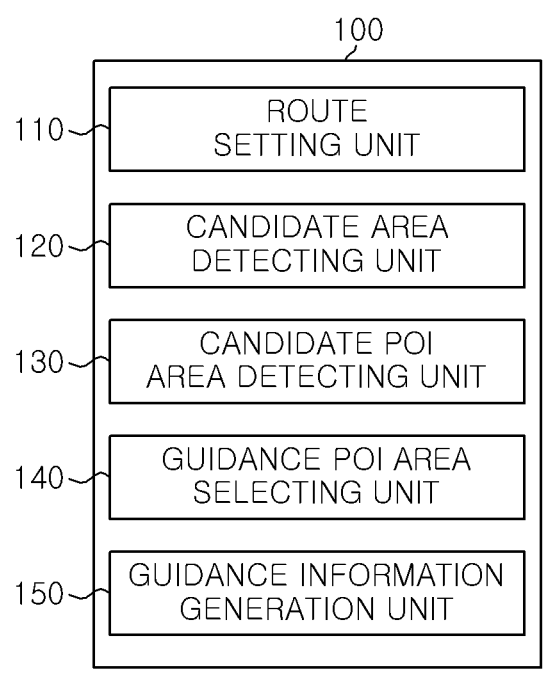
FIG. 2 illustrates a block diagram of a device for generating intersection guidance information in accordance with an exemplary embodiment of the present invention.

FIG. 2 illustrates a block diagram of a device 100 for generating intersection guidance information in accordance with an exemplary embodiment of the present invention.

The device 100 for generating intersection guidance information includes a route setting unit 110, a candidate area detecting unit 120, a candidate POI area detection area 130, a guidance POI area selecting unit 140, and a guidance information generating unit 150.

Figure 4:
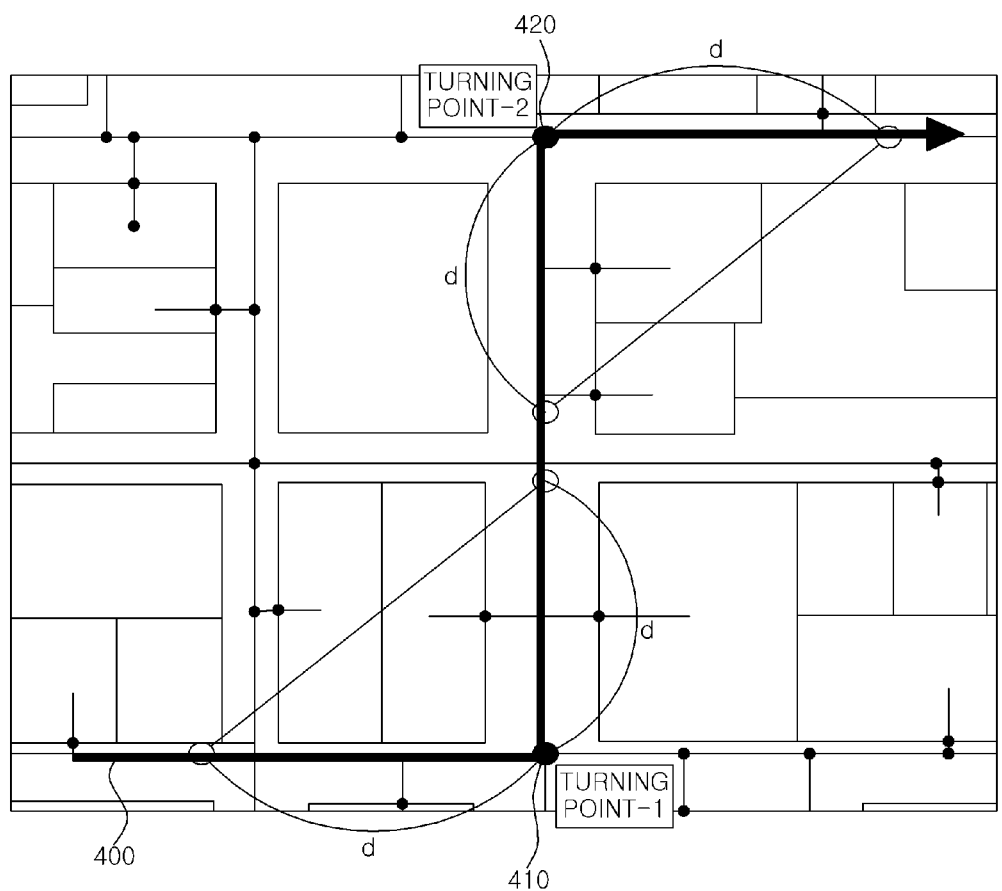
FIG. 4 shows a searched route provided by a device for generating intersection guidance information in accordance with an exemplary embodiment of the present invention.

The route setting unit 110 receives a route up to an intended destination and sets it as input data to generate guidance information. The route may be transferred from external devices or may be generated inside the device. The external devices used to transfer searched route may be a navigation system, a smart phone and a PC. The results produced from the route navigation may be provided as illustrated in FIG. 4 together with a map.

The candidate area detecting unit 120 searches a turning point at an intersection on the searched route, and detects surroundings of the turning point as a candidate area. The detection of the candidate area is intended to generate intersection guidance information using POI areas, which are detected by the candidate POI area detecting unit 130 based on geometry data on a map, within the detected candidate area. The detected candidate area may be an area shaped in a triangle whose one apex becomes the turning point and whose two segments becomes both routes connected to the turning point. Further, the detected candidate area may be an internal area of an arbitrary closed curve (for example, a triangle, a circle, an ellipse, a lozenge, a tetragon, etc) which passes through both of two points that are apart from the turning point at a predetermined distance.

When the candidate POI area is not detected through the candidate POI area detecting unit 130, the candidate area may be newly set by differently setting the two points that are apart from the turning point at a predetermined distance.

Figure 6:
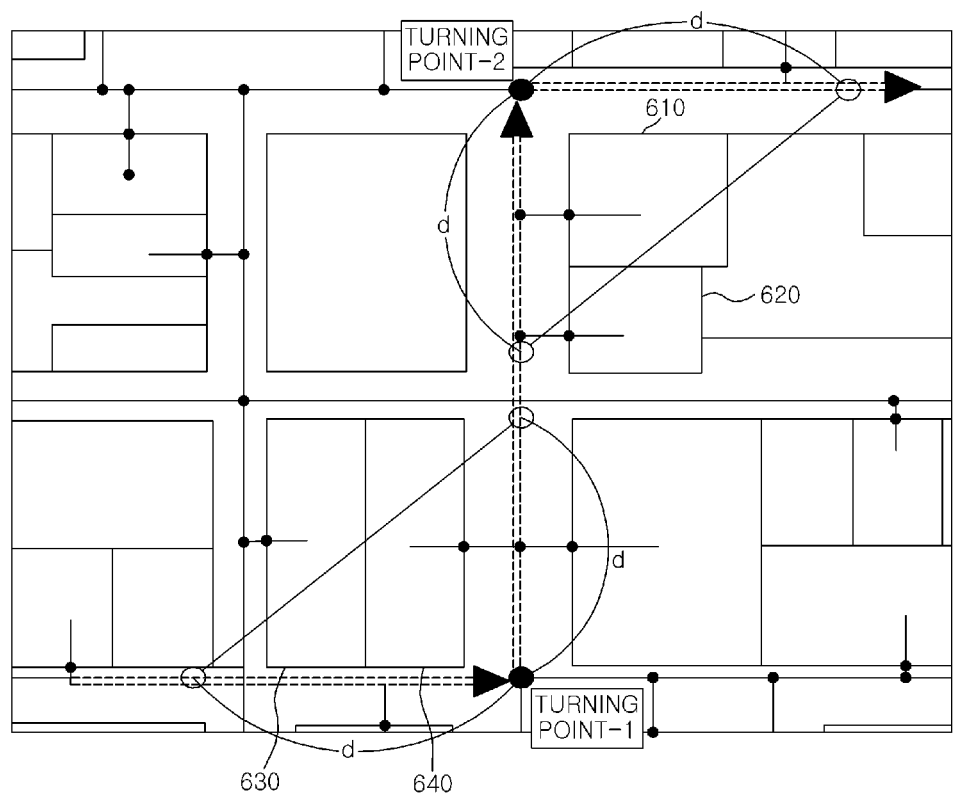
FIG. 6 shows candidate POI areas provided by a device for generating intersection guidance information in accordance with an exemplary embodiment of the present invention.

The candidate POI area detecting unit 130 detects one or more POI areas within a candidate area. The candidate POI area detecting unit 130 detects one or more POI areas that contained in the boundary of the candidate area or partially overlaps the candidate area, among the POI areas within the candidate area. The detected candidate POI area may be plural. When at least two POIs are detected, one POI area may be selected in consideration of a client's current position (e.g., driver's current position). The candidate POI area detecting unit 130 may detect candidate POI areas 610 to 640 as illustrated in FIG. 6. When the candidate POI areas are not detected at all, it may be performed to detect candidate area again.

The guidance POI area selecting unit 140 selects a guidance POI area used to generate intersection guidance information. The guidance POI area selecting unit 140 selects as a guidance POI area a POI area nearest to a turning point among the candidate POI area detected by the candidate POI area detecting unit 130. The POI information of the guidance POI area selected by the guidance POI area selecting unit 140 is used to generate intersection guidance information.

When at least two POI areas are selected by the guidance POI area selecting unit 140, one POI area may be selected as a guidance POI area in consideration of a client's position, a moving direction and a final destination.

The guidance information generating unit 150 generates guidance information using POI information of the guidance POI area. The guidance information may include guidance POI area information and turning direction information, for example, such as 'turn right centering around a guidance POI area at a guidance POI area 100 m ahead'. The turning direction information may be a right turn, a left turn, a P-turn, a U-turn, a rotary turn, etc. The guidance information generated may be guided in a voice message or a text message.

Figure 3:
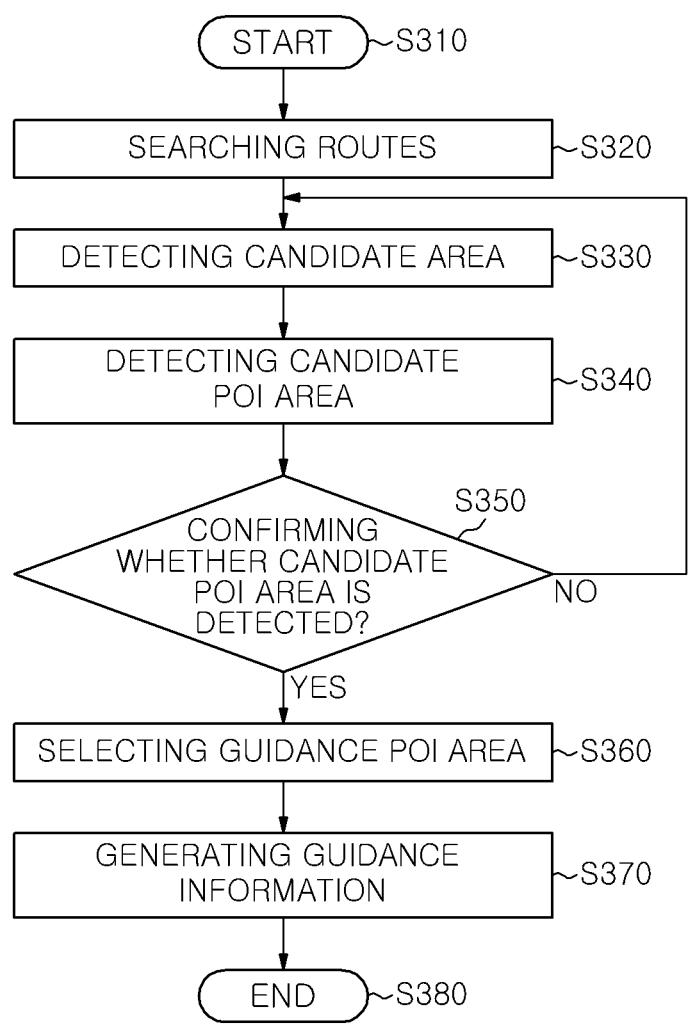
FIG. 3 is a flowchart illustrating a method for generating intersection guidance information in accordance with an exemplary embodiment of the present invention.

FIG. 3 is a flowchart illustrating a method for generating intersection guidance information in accordance with an exemplary embodiment of the present invention.

The method for generating intersection guidance information may include steps of searching routes (Block S320), detecting a candidate area (Block S330), detecting a candidate POI area (Block S340), determining whether to detect a candidate POI area (Block S350), selecting a guidance POI area (Block S360), and generating guidance information (Block S370).

Figure 7:
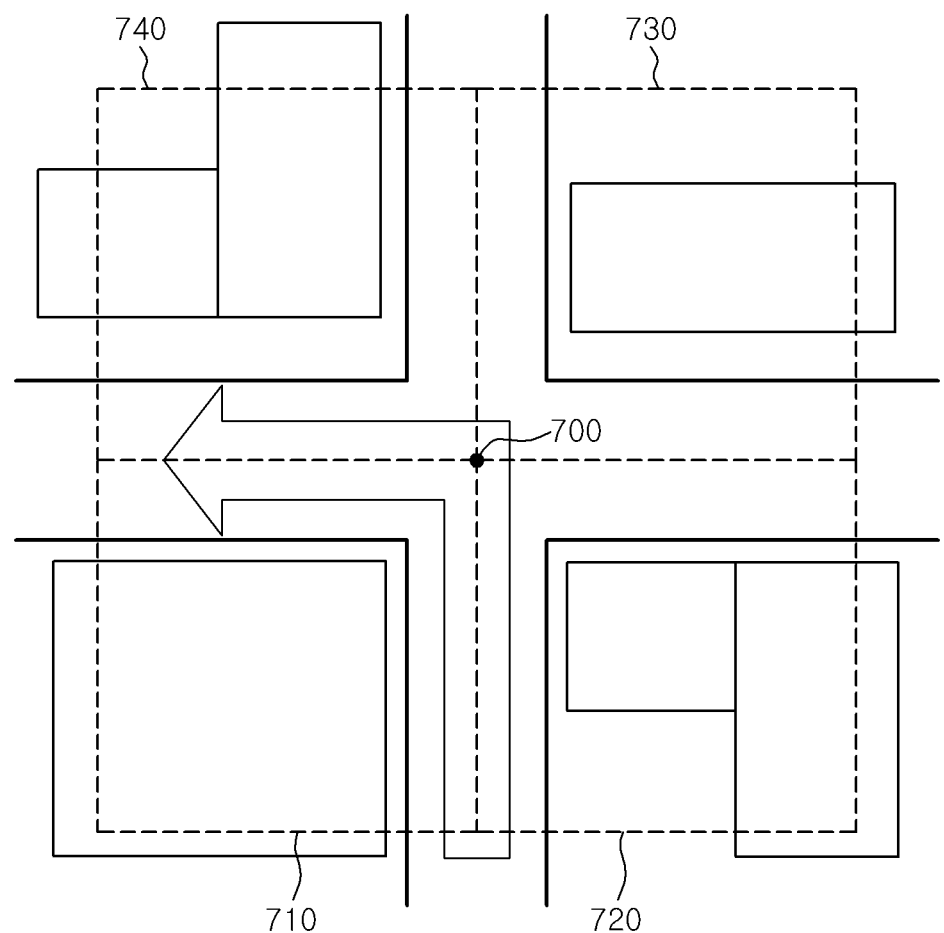
FIG. 7 shows candidate areas detected by a device for generating intersection guidance information in accordance with an exemplary embodiment of the present invention.

At the step of searching routes (Block S320), a server or local device searches routes up to a destination. The searched route is provided as illustrated in FIGS. 4 and 7 together with a map.

The step of detecting a candidate area (Block S330) includes detecting a candidate area including a POI area from a map before detecting POI area information that can be used to generate guidance information. The candidate area refers to a surrounding area of a turning point, which may be a triangle area of which an apex is the turning point and whose two segments are routes connected to the turning point. Alternatively, the candidate area may be an internal area of an arbitrary closed curve that passes through all of arbitrary two points that are apart from the turning point at predetermined distances and a turning point.

Figure 5:
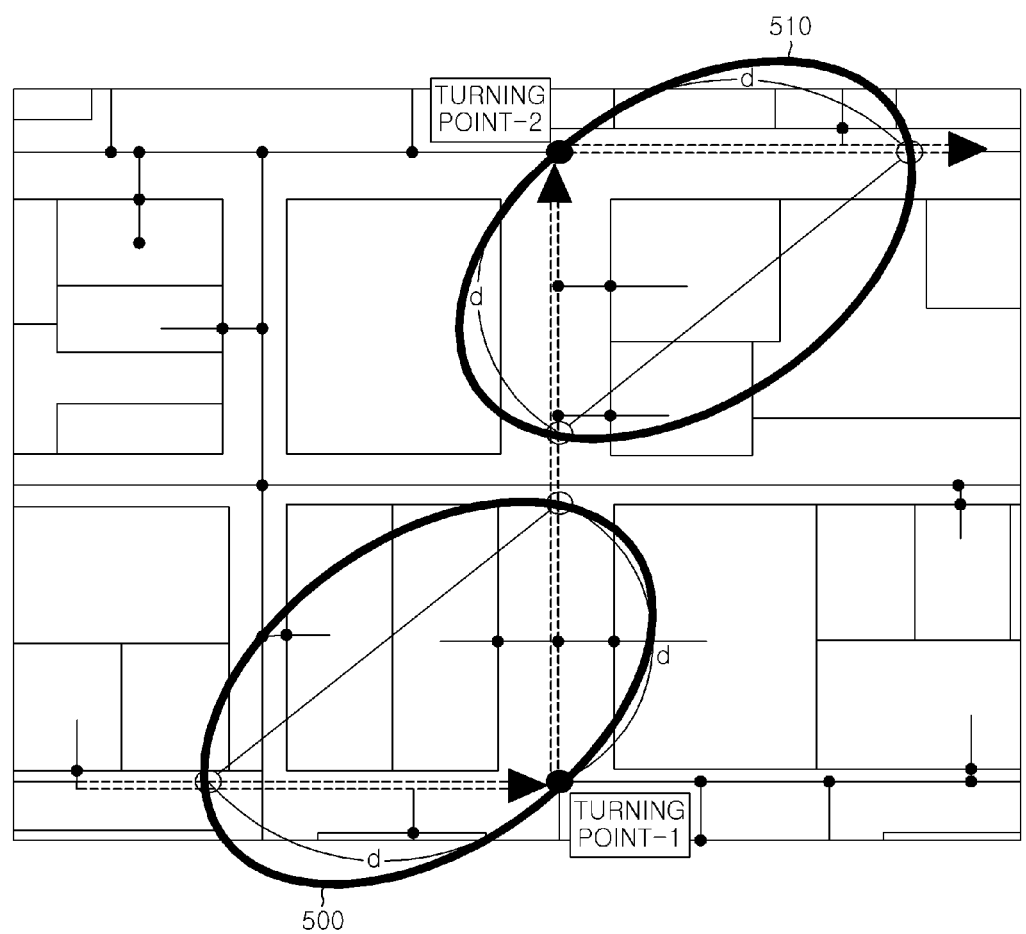
FIG. 5 shows a candidate area provided by a device for generating intersection guidance information in accordance with an exemplary embodiment of the present invention.

As illustrated in FIG. 5, reference numerals 500 and 510 may be candidate areas with respect to each turning point.

The step of detecting a candidate POI area (Block S340) includes detecting a candidate POI area that overlaps the candidate or is a space within the candidate area. The candidate POI area may be a space that is wholly included in the candidate area or whose portion is included in the candidate area. The step of detecting the candidate POI area (Block S340) includes detecting a candidate POI area as illustrated in FIG. 6. The number of the detected candidate POI areas may be 0 or more.

The step of determining whether to detect the candidate POI area (Block S350) includes determining whether the candidate POI area was detected. At the step of determining whether to detect the candidate POI area (Block S350), when the number of the candidate POI area is zero, the step proceeds to the step of detecting a candidate area (Block S330) where a candidate area may be detected again. In this case, it may be is possible to set as a candidate area another area that is not overlapped with an internal area of the closed curve mentioned above.

The step of selecting the guidance POI area (Block S360) includes selecting a guidance POI area used to generate intersection guidance information. The step of selecting a guidance POI area (Block S360) includes selecting as a guidance POI area a candidate POI area that is nearest to the turning point among the candidate POI areas. The step of selecting the guidance POI area (Block S360) may include selecting the guidance POI area using distance between the candidate POI area and the turning point. The step of selecting the guidance POI area (Block S360) may include selecting the guidance POI area using distance between each apex or center and the turning point.

The step of selecting the guidance POI area (Block S360) may include selecting as the guidance POI area one POI area in consideration of a client's position, a moving direction and a final destination when at least two POI areas are selected.

The step of generating the guidance information (Block S370) includes generating guidance information using POI information of the POI area and turning direction information at an intersection. The turning direction information of the guidance POI area may include a right turn, a left turn, a rotary turn, a P-turn, and a U-turn.

The intersection guidance information generated by the device and method for generating guidance information in accordance with an exemplary embodiment of the present invention may be utilized in a navigation system, a smart phone, an Internet path finding Website, and the like. The intersection guidance information may be provided in a voice message or text message.

FIGS. 4 to 6 illustrate searched routes, candidate areas and candidate POI areas provided by a device for generating intersection guidance information in accordance with an exemplary embodiment of the present invention.

Referring to FIG. 4, the searched route 400 may be illustrated together with a map. As a result of analyzing the searched route as illustrated, a turning point-1 410 and a turning point-2 420 are searched for.

Referring to FIG. 5, two points that are apart from the detected turning point-1 410 at a predetermined distance are selected, and an internal area of an arbitrary closed curve that passes through both turning points-1 and -2 is detected as a candidate area. The distance between the turning points 1 and 2 may be an arbitrary positive number.

Spaces that have a portion overlapped with the detected candidate area 500 are detected as candidate POI areas. Referring to FIG. 6, two candidate POI areas 630 and 640 are detected.

Distances between each of the candidate POI areas 630 and 640 and a turning point 410 are calculated. Distances between each apex or center of the candidate POI areas 630 and 640 and the turning point-1 410 may be calculated.

FIG. 7 shows candidate areas detected by a device for generating intersection guidance information in accordance with an exemplary embodiment of the present invention. Here, the arrow indicates a route, and the route includes a turning point 700. The device and method for generating intersection guidance information in accordance with the present invention detects a candidate area again when a candidate POI area is not detected. In this case, as illustrated in FIG. 7, the candidate area may be detected in the order of 710, 720, 730 and 740. Further, the candidate area may be detected in the order of 710, 740, 730, and 720. There is no limitation in the order of candidate area detection. The shape of the candidate area is not limited to a tetragon but may be an arbitrary closed curve (e.g., a circle, an ellipse, a triangle, a lozenge, a trapezoid, etc).

The device and method for generating intersection guidance information in accordance with an exemplary embodiment of the present invention may be utilized in a map indicating an interior space as well as a common map. The POI area refers to a space divided logically according to usage in a map, which indicates an interior space, or a space divided into a shop, a bank, an office, etc. in a map indicating an exterior space.

Further, in the device and method for generating intersection guidance information in accordance with an exemplary embodiment of the present invention, the guidance POI area is not limited to shops and stores positioned at 1st floor but may be selected as POI information of shops and stores positioned at 2nd floor or higher.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A device for generating intersection guidance information in real time while providing a route navigation service, the device comprising:
    a route setting unit configured to receive a route up to a destination;
    a candidate area detecting unit configured to search for a turning point on a searched route, and detect a surrounding area of the searched turning point as a candidate area;
    a candidate POI (point of interest) area detecting unit configured to detect a POI area as a candidate POI area, at least a portion of the POI area being included in the candidate area;
    a guidance POI area selecting unit configured to calculate distance between a point within the candidate POI area and the turning point, search the candidate POI area whose distance calculated is shortest, and select the searched candidate POI area as a guidance POI area; and
    guidance information generating unit configured to generate guidance information for an intersection including the guidance POI area;
    wherein the candidate area detecting unit sets the searched turning point, and a first point and a second point that are set apart from the searched turning point at a predetermined distance, and detects as the candidate area an internal area of an arbitrary closed curve that passes through all of the turning point, and the first and second points; and
    wherein when the candidate POI area detecting unit did not detect the candidate POI area, the candidate area detecting unit sets a third point and a fourth point that are apart from the turning point at a previously determined distance, the third and fourth points being different from the first point or the second point, and detects as a candidate area an internal area of an arbitrary closed curve that passes through all of the turning point, the third point, and the fourth point.

2. The device of claim 1, wherein the guidance information further comprises at least one of a distance from a current position to the intersection, and turning direction information at the intersection.

3. The device of claim 2, wherein the turning direction information comprises at least one of a left turn, a right turn, a U-turn, a P-turn and a rotary turn.

4. The device of claim 1, wherein the guidance POI area selecting unit calculates distance between the candidate POI area and the turning point, and selects as a guidance POI area the candidate POI area whose distance calculated is shortest.

5. The device of claim 1, wherein the guidance POI area selecting unit selects the guidance POI area in consideration of at least one of a client's position, a client's moving direction and a final destination.

6. The device of claim 1, wherein the route setting unit receives the route that is searched from an external device or the route that is searched internally and sets the searched route as input data to generate guidance information.

* * * * *